United States Patent
Gaugler et al.

(10) Patent No.: US 11,664,554 B2
(45) Date of Patent: May 30, 2023

(54) BATTERY HAVING A PRISMATIC HOUSING AND PRODUCTION METHOD THEREOF

(71) Applicant: VW-VM Forschungsgesellschaft mbH & Co. KG, Ellwangen Jagst (DE)

(72) Inventors: Andreas Gaugler, Ellwangen (DE); Andreas Huth, Ellwangen (DE); Werner Schreiber, Meine (DE); Stefan Stock, Rainau (DE)

(73) Assignees: VARTA Microbattery GmbH, Ellwangen Jagst (DE); VW Kraftwerk GmbH, Wolfsburg (DE)

( * ) Notice: Subject to any disclaimer, the term of this patent is extended or adjusted under 35 U.S.C. 154(b) by 332 days.

(21) Appl. No.: 15/503,026

(22) PCT Filed: Jul. 22, 2015

(86) PCT No.: PCT/EP2015/066810
§ 371 (c)(1),
(2) Date: Feb. 10, 2017

(87) PCT Pub. No.: WO2016/026647
PCT Pub. Date: Feb. 25, 2016

(65) Prior Publication Data
US 2017/0229681 A1    Aug. 10, 2017

(30) Foreign Application Priority Data

Aug. 19, 2014    (DE) ..................... 10 2014 216 435.4

(51) Int. Cl.
*H01M 50/258* (2021.01)
*H01M 50/00* (2021.01)
*H01M 50/103* (2021.01)

(52) U.S. Cl.
CPC ......... *H01M 50/258* (2021.01); *H01M 50/00* (2021.01); *H01M 50/103* (2021.01)

(58) Field of Classification Search
None
See application file for complete search history.

(56) References Cited

U.S. PATENT DOCUMENTS 3,967,979 A * 7/1976 Kaye ................... H01M 2/1055
429/99
4,593,461 A * 6/1986 Thiele ................. H01M 50/213
29/623.1

(Continued)

FOREIGN PATENT DOCUMENTS

DE     100 42 654 A1    3/2002
DE     100 47 206 A1    6/2002

(Continued)

OTHER PUBLICATIONS

Definition of "weld" from www.dictionary.com (2018).*

(Continued)

*Primary Examiner* — Carmen V Lyles-Irving
(74) *Attorney, Agent, or Firm* — DLA Piper LLP (US)

(57) ABSTRACT

A method of producing a battery with a prismatic battery housing includes assembling a battery housing from two prefabricated housing parts, of which the first housing part includes at least a partial region of the element including the at least one through hole as well as at least a partial region of a second element, bordering on the element including the at least one through hole, and the second housing part includes all elements and/or partial regions of elements not part of the first housing part.

11 Claims, 3 Drawing Sheets

(56) References Cited

U.S. PATENT DOCUMENTS

| | | | |
|---|---|---|---|
| 4,596,461 A * | 6/1986 | DeRosa | G01K 17/003 356/121 |
| 6,174,620 B1 * | 1/2001 | Okada | H01M 2/0202 429/176 |
| 6,197,444 B1 * | 3/2001 | Vackar | H01M 2/0237 429/99 |
| 6,399,910 B1 | 6/2002 | Crawford et al. | |
| 2001/0008725 A1 | 7/2001 | Howard | |
| 2001/0049057 A1 | 12/2001 | Frustaci et al. | |
| 2004/0058231 A1 | 3/2004 | Takeshita et al. | |
| 2005/0058892 A1 * | 3/2005 | Ovshinsky | H01M 10/6551 429/120 |
| 2011/0250475 A1 | 10/2011 | Yamamoto et al. | |
| 2012/0052354 A1 | 3/2012 | Hattori et al. | |
| 2012/0064399 A1 * | 3/2012 | Carlson | H01M 2/145 429/209 |
| 2012/0079713 A1 | 4/2012 | Hosokawa et al. | |
| 2013/0115494 A1 | 5/2013 | Kim | |
| 2013/0207459 A1 * | 8/2013 | Schroder | H01M 2/1077 307/10.1 |
| 2014/0308555 A1 | 10/2014 | Hattori et al. | |
| 2015/0194642 A1 | 7/2015 | Yamamoto et al. | |

FOREIGN PATENT DOCUMENTS

| | | |
|---|---|---|
| DE | 10 2011 016 799 | 3/2012 |
| DE | 10 2012 213 557 A1 | 2/2014 |
| EP | 2 378 588 A2 | 10/2011 |
| GB | 2 087 636 A | 5/1982 |
| JP | 09-213284 | 8/1997 |
| JP | 2001-313007 | 11/2001 |
| JP | 2012-174433 A | 9/2012 |
| JP | 2012-199021 | 10/2012 |
| JP | 2013-200974 | 10/2013 |
| JP | 2014-59954 A | 4/2014 |
| WO | 2013/023774 A1 | 2/2013 |
| WO | 2013/035668 A1 | 3/2013 |

OTHER PUBLICATIONS

Notice of Reason for Rejection dated Jan. 5, 2018, of corresponding Japanese Application No. 2016-569419, along with an English translation.

Notification of Provisional Rejection dated Jan. 10, 2018, of counterpart Korean Application No. 10-2017-7006562, including a corresponding report for Office Action in English.

* cited by examiner

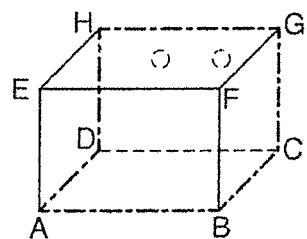 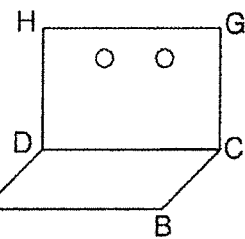
Fig. 1(a)　　　Fig. 1(b)　　　Fig. 1(c)
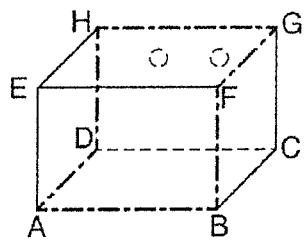 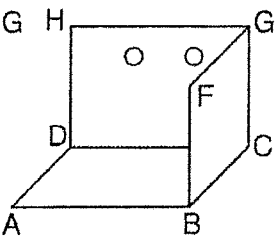
Fig. 2(a)　　　Fig. 2(b)　　　Fig. 2(c)
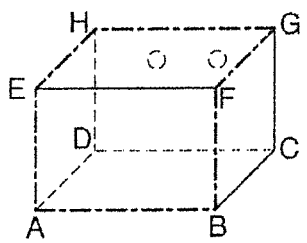 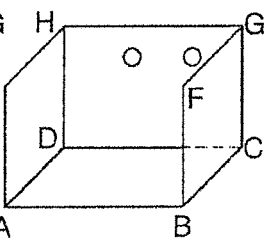
Fig. 3(a)　　　Fig. 3(b)　　　Fig. 3(c)
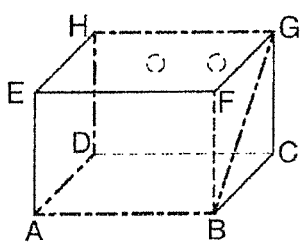 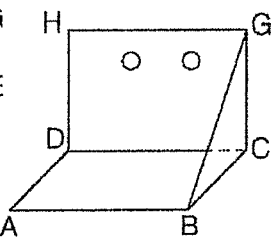
Fig. 4(a)　　　Fig. 4(b)　　　Fig. 4(c)

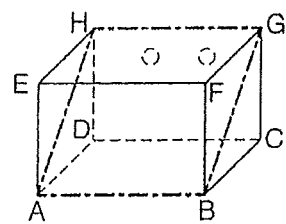
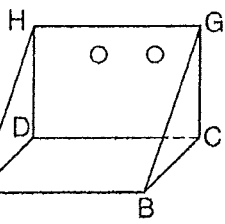
Fig. 5(a)  Fig. 5(b)  Fig. 5(c)
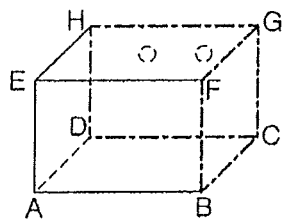
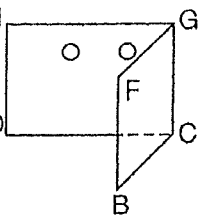
Fig. 6(a)  Fig. 6(b)  Fig. 6(c)
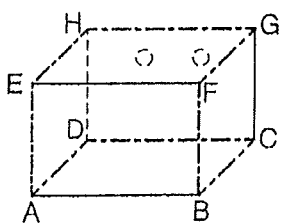
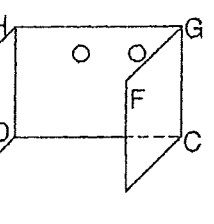
Fig. 7(a)  Fig. 7(b)  Fig. 7(c)
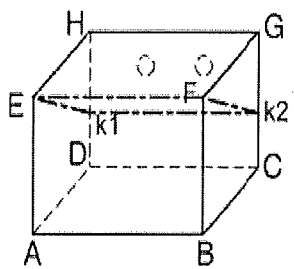
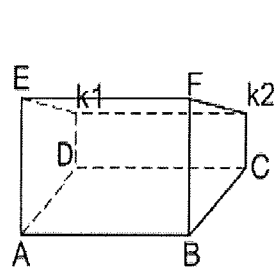
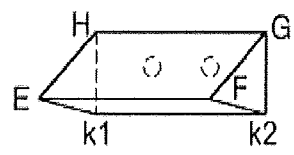
Fig. 8(a)  Fig. 8(b)  Fig. 8(c)

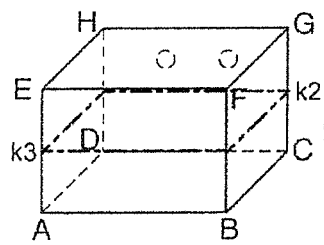 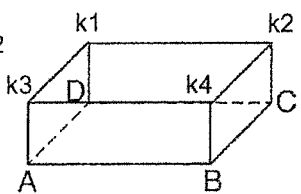 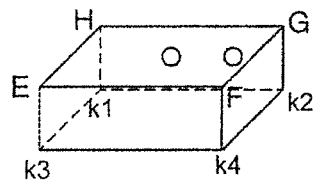
Fig. 9(a)     Fig. 9(b)     Fig. 9(c)
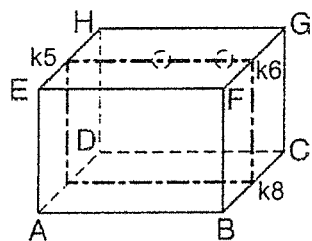 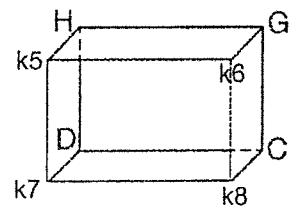 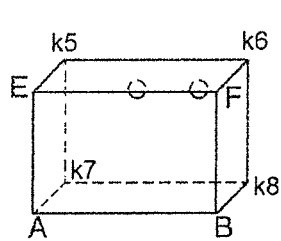
Fig. 10(a)     Fig. 10(b)     Fig. 10(c)
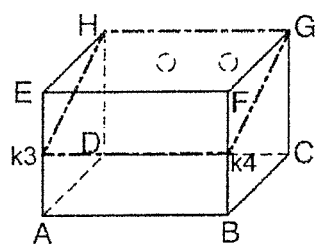 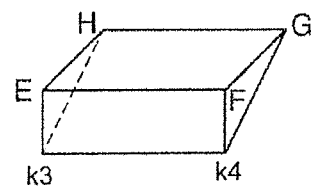 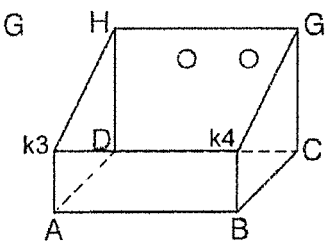
Fig. 11(a)     Fig. 11(b)     Fig. 11(c)
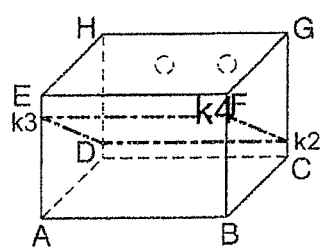 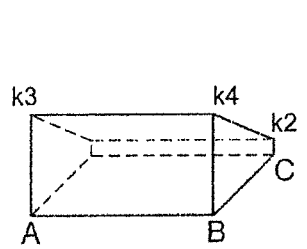 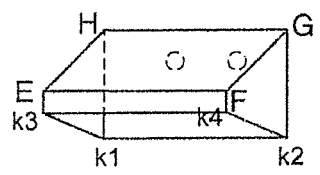
Fig. 12(a)     Fig. 12(b)     Fig. 12(c)

BATTERY HAVING A PRISMATIC HOUSING AND PRODUCTION METHOD THEREOF

TECHNICAL FIELD

This disclosure concerns a battery with a prismatic battery housing in which at least one positive and at least one negative battery electrode as well as at least one separator separating the electrodes are arranged. At least one contact pole is led through the housing, which contact pole electrically connects to at least one of the electrodes disposed in the housing.

BACKGROUND

Lithium ion batteries for motor vehicles often have a prismatic metal housing. Usually the housing is composed of a container with a rectangular bottom and four side walls arranged at right angles to the bottom, as well as a lid, which has substantially the same shape and size as the bottom. The lid is generally barely profiled and can be described as being approximately flat. The housing is closed by welding the edges of the lid to the opening edge of the container.

The at least one contact pole mentioned is generally led through the lid. Prior to welding, it must be connected to the electrodes, which from a production standpoint can cause problems since the electrodes arranged in the container are not freely accessible.

It could therefore be helpful to simplify the production of batteries with a prismatic housing.

SUMMARY

Our method serves for the production of a battery with a prismatic battery housing. This housing comprises a bottom element, a lid element disposed parallel to the bottom element, having the same size and shape as the bottom element, as well as four side elements connecting the bottom element and the lid element. Together, these elements define an enclosed interior, in which functional parts of the battery, especially at least one positive and at least one negative battery electrode as well as at least one separator separating the electrodes, and also optionally two or more individual cells hooked up in series or in parallel to each other, are arranged.

BRIEF DESCRIPTION OF THE DRAWINGS

FIGS. 1(a), (b) and (c) are perspective views of an example of two housing portions on a righthand side of the figure (c), a middle portion of the figure (b) and the two combined housing portions on the lefthand side of the figure (a).

FIGS. 2(a), (b) and (c) are perspective views of a second example of two housing portions on a righthand side of the figure (c), a middle portion of the figure (b) and the two combined housing portions on the lefthand side of the figure (a).

FIGS. 3(a), (b) and (c) are perspective views of a third example of two housing portions on a righthand side of the figure (c), a middle portion of the figure (b) and the two combined housing portions on the lefthand side of the figure (a).

FIGS. 4(a), (b) and (c) are perspective views of a fourth example of two housing portions on a righthand side of the figure (c), a middle portion of the figure (b) and the two combined housing portions on the lefthand side of the figure (a).

FIGS. 5(a), (b) and (c) are perspective views of a fifth example of two housing portions on a righthand side of the figure (c), a middle portion of the figure (b) and the two combined housing portions on the lefthand side of the figure (a).

FIGS. 6(a), (b) and (c) are perspective views of a sixth example of two housing portions on a righthand side of the figure (c), a middle portion of the figure (b) and the two combined housing portions on the lefthand side of the figure (a).

FIGS. 7(a), (b) and (c) are perspective views of a seventh example of two housing portions on a righthand side of the figure (c), a middle portion of the figure (b) and the two combined housing portions on the lefthand side of the figure (a).

FIGS. 8(a), (b) and (c) are perspective views of an eighth example of two housing portions on a righthand side of the figure (c), a middle portion of the figure (b) and the two combined housing portions on the lefthand side of the figure (a).

FIGS. 9(a), (b) and (c) are perspective views of a ninth example of two housing portions on a righthand side of the figure (c), a middle portion of the figure (b) and the two combined housing portions on the lefthand side of the figure (a).

FIGS. 10(a), (b) and (c) are perspective views of a tenth example of two housing portions on a righthand side of the figure (c), a middle portion of the figure (b) and the two combined housing portions on the lefthand side of the figure (a).

FIGS. 11(a), (b) and (c) are perspective views of an eleventh example of two housing portions on a righthand side of the figure (c), a middle portion of the figure (b) and the two combined housing portions on the lefthand side of the figure (a).

FIGS. 12(a), (b) and (c) are perspective view of a twelfth example of two housing portions on a righthand side of the figure (c), a middle portion of the figure (b) and the two combined housing portions on the lefthand side of the figure (a).

DETAILED DESCRIPTION

The prismatic layout of the battery housing necessitates that each of the total of six elements is adjoined by four of the remaining five elements. Thus, for example, the four side elements each border on the bottom element and the lid element. Any given side element is bordered by two other side elements in each case as well as the bottom element and the lid element. Adjoining elements preferably make a right angle with each other. Furthermore, it is preferred that each of the elements is flat and has a uniform thickness over its entire surface, for example, a thickness of 0.5 mm to 5 mm.

At least one of the elements comprises one or more through holes, through which a contact pole is led, which contact pole electrically connects to at least one of the electrodes disposed in the interior. This need not necessarily be the lid element or the bottom element. It is equally possible for the at least one through hole to be led, for example, through one of the side elements.

In most cases, the housing of the battery has two through holes as well as two contact poles led through them, one of which connects to the at least one positive and the other to the at least one negative electrode. As a general rule, the contact poles are electrically and mechanically separated from the housing by an insulating compound, as is specified in DE 100 47 206 A1, for example. If both poles are insulated in this way, the housing is potential-free.

Basically, it is also possible for the housing itself to serve as a positive or negative contact pole. For this purpose, it must be electrically conductive and connected to the at least one positive or the at least one negative electrode. Preferably, however, it consists of a metal, especially aluminum or an aluminum alloy, or it is provided with a metallic coating. Especially preferably, the elements of the housing (the bottom element, the lid element and the side elements) consist of a metal sheet, especially an aluminum sheet.

The contact poles connect to an electrical consumer. Optionally, however, they can also serve merely as a bridge through the housing. In these cases, for example, special tapping poles can be provided to connect to an electrical consumer, which are connected across the contact poles to the electrodes.

The method is especially characterized in that the battery housing is assembled from two prefabricated housing parts, of which the first housing part comprises at least a partial region of the element comprising the at least one through hole as well as at least a partial region of a second element, bordering on the element comprising the at least one through hole, and the second housing part comprises all the elements and/or partial regions of elements which are not part of the first housing part.

Each element of the battery housing (the bottom element, the lid element and the side elements) comprises an inner side facing the interior and an outer side facing the exterior. The outer sides of the elements, added together, give the surface of the battery housing. By a partial region of an element is meant, especially preferably, a portion of the element comprising 1% to 99%, preferably 10% to 99%, especially preferably 20% to 99%, especially 25% to 99%, of the outer side of the element, i.e., for example, 20% of the outer side of the lid element.

As a rule, the partial region of the element comprising the at least one through hole also comprises the at least one through hole itself. Especially preferably, the element comprising the at least one through hole is in its entirety part of the first housing half-piece.

Furthermore, it may be preferable for the first housing half-piece to also comprise the second element entirely. Preferably, moreover, it can also comprise a third element or a partial region of a third element bordering on the second element or a partial region of same or on the element comprising the through hole or a partial region of same.

Further preferably, the first housing half-piece can also comprise a fourth element or a partial region of a fourth element bordering on the element comprising the through hole and/or on the second and/or on the third element or a partial region of the elements.

The first and the second housing part are preferably a single piece. For example, they can be made by molding or casting.

Especially preferably, the housing is cuboidal. A cuboid, as is known, is a body with six rectangular surfaces (a base surface, a top surface opposite to the base surface, and four side surfaces), whose angles are all right angles, as well as eight right-angled corners and twelve right-angled edges, every four of which are parallel to each other. Opposite surfaces of a cuboid are always congruent.

Especially preferably, the two prefabricated housing parts joined together form a cuboidal housing with six rectangular surfaces, eight corners and twelve edges, whose base surface is formed by the mentioned bottom element and has four corners A, B, C and D and whose top surface is formed by the mentioned lid element and has four corners E, F, G and H, wherein the corner E is disposed above the corner A, the corner F above the corner B, the corner G above the corner C and the corner H above the corner D.

The at least one through hole can be introduced, for example, in the side surface defined by the corners C, D, G and H or one of the other three side surfaces (defined by the corners B, C, F and G or A, B, E and F or D, A, H and E). Alternatively, for example, it can also be introduced in the top surface defined by the corners E, F, G and H or in the base surface.

Preferably, the two housing parts are joined together along four lines of connection, especially along lines of connection all lying in the same plane, especially preferably along the four lines of connection defined by the following coordinates:

A-B-G-H-A
All the coordinates are corners. Two of the lines of connection correspond to edges of the housing (A-B and G-H), while another two lines of connection are surface-dividing lines of connection, preferably surface diagonals (B-G and H-A). All lines of connection preferably lie in the same plane.
F-CG-DH-E-F
The coordinates here are two corners as well as two points at the edges CG and DH. Only one line of connection (E-F) corresponds to an edge, the other three lines of connection are surface-dividing lines of connection. All lines of connection preferably lie in the same plane.
G-H-AE-BF-G
The coordinates here are two corners as well as two points at the edges AE and BF. Only one line of connection (G-H) corresponds to an edge, the other three lines of connection are surface-dividing lines of connection. All lines of connection preferably lie in the same plane.
AE-BF-CG-DH-AE
The coordinates here are four points on the edges AE, BF, CG and DH. All lines of connection preferably lie in the same plane and are surface-dividing lines of connection extending parallel to edges, especially surface-bisecting lines of connection extending parallel to edges.
AE-BF-CG-DH-AE The coordinates here are four points on the edges AE, BF, CG and DH. All lines of connection preferably lie in the same plane and are surface-dividing lines of connection, while two of the lines of connection extend parallel to edges and another two extend antiparallel.
BC-FG-EH-AD-BC
The coordinates here are four points on the edges BC, FG, EH and AD. All lines of connection preferably lie in the same plane and are surface-dividing lines of connection.

Preferably, the two housing parts are joined together along five lines of connection, especially along the five lines of connection defined by the following coordinates:

A-B-G-H-D-A
The coordinates here are five corners. The lines of connection accordingly correspond to four edges (A-B, G-H, H-D and D-A) as well as one surface-dividing line of connection, preferably a surface diagonal (B-G).

Preferably, the two housing parts are joined together along six lines of connection, especially along the six lines of connection defined by the following coordinates:

A-B-C-G-H-D-A

These six coordinates are corners of the housing. All lines of connection are edges.

A-B-F-G-H-D-A

These six coordinates are corners of the housing. All lines of connection are edges.

A-B-F-G-H-E-A

These six coordinates are corners of the housing. All lines of connection are edges.

B-F-G-H-D-C-B

These six coordinates are corners of the housing. All lines of connection are edges.

Preferably, the two housing parts are joined together along eight lines of connection, especially along the eight lines of connection defined by the following coordinates:

B-F-G-H-E-A-D-C-B

These eight coordinates are corners. All lines of connection are edges.

The indicated coordinates in each case represent starting and ending points of lines of connection. At each coordinate, there is a change in direction of the lines of connection so that two consecutive lines of connection never have the same direction. Preferably, the lines of connection are straight lines (especially in the case of edges). But departures from a straight line are also possible.

When the coordinates are points on edges, it is preferable for these points to lie in the middle of the respective edges, but at least to have a distance from the corners defining the respective edge of at least 10% of the edge length, especially preferably at least 25% of the edge length.

It is especially preferred that the first and the second housing part have a symmetrical relation to each other, apart from the at least one through hole, in particular can be converted into each other by mirror imaging or mirror rotation. Especially preferable examples of such a configuration of the housing parts are the already mentioned instances.

A-B-G-H-A

AE-BF-CG-DH-AE (in two possible variants, see above)

BC-FG-EH-AD-BC

A-B-F-G-H-D-A

Also preferably, the first and the second housing part, apart from the at least one through hole, are half-pieces of identical size and shape. Examples of these are the already mentioned instances.

A-B-G-H-A

AE-BF-CG-DH-AE (in two possible variants, see above)

BC-FG-EH-AD-BC

Especially preferably, the housing parts are joined together by welds.

Preferably, our method involves one or more of the following steps:

Several functional parts are arranged as a preassembled unit on the first housing part.

Individual functional parts are mounted on the first housing part to form a larger unit of several functional parts.

A contact pole is led through a through hole in one of the elements of the first housing part and fixed therein so that it is electrically insulated from the element comprising the through hole and thus from the first housing part.

The contact pole electrically connects to one of the electrodes.

The second housing part joins together with the first housing part to form a housing.

The individual steps mentioned need not necessarily be carried out in the indicated sequence, and neither do all of them have to be implemented. Thus, for example, as a rule, the first two method steps mentioned stand as alternatives to each other.

What is common to all examples mentioned is that mounting the contact poles and their making contact with the respective electrodes can proceed more easily than when using housing parts such as are known.

Our battery, in keeping with the foregoing remarks, comprises as functional parts at least one positive and at least one negative battery electrode as well as at least one separator separating the electrodes. Optionally, it also comprises two or more individual cells hooked up in series or parallel to each other. Furthermore, it comprises a prismatic housing made up of a bottom element, a lid element disposed parallel to the bottom element, having the same size and shape, as well as four side elements connecting the bottom element and the lid element, which together define an enclosed interior, in which the functional parts of the battery are arranged. At least one of the elements comprises at least one through hole, through which a contact pole is led, which contact pole produces an electrical contact to a positive and/or negative electrode disposed inside the housing.

In particular, the battery is characterized in that the battery housing consists of two housing parts, of which the first housing part comprises at least a partial region of the element comprising the at least one through hole as well as at least a partial region of a second element, directly bordering on the element comprising at least one through hole, and the second housing part comprises all the elements and/or partial regions of elements which are not part of the first housing part.

Preferred examples of the housing parts have already been described in connection with the method. To avoid repetition, reference is herewith made to the corresponding remarks.

However, it should be particularly emphasized once more that in especially preferred examples the housing is cuboidal with six rectangular surfaces, eight corners and twelve edges, wherein the base surface of the cuboid is formed by the bottom element and has four corners A, B, C and D and the top surface of the cuboid is formed by the lid element and has four corners E, F, G and H, wherein the corner E is disposed above the corner A, the corner F above the corner B, the corner G above the corner C and the corner H above the corner D and wherein the first and the second housing part join together along four lines of connection, especially the lines of connection defined by the following coordinates

A-B-G-H-A

F-CG-DH-E-F

G-H-AE-BF-G

AE-BF-CG-DH-AE (in two possible variants, see above)

BC-FG-EH-AD-BC or along five lines of connection, especially the lines of connection defined by the following coordinates

A-B-G-H-D-A or along six lines of connection, especially the lines of connection defined by the following coordinates

A-B-C-G-H-D-A

A-B-F-G-H-D-A

A-B-F-G-H-E-A

B-F-G-H-D-C-B or along eight lines of connection, especially the lines of connection defined by the following coordinates
B-F-G-H-E-A-D-C-B
and wherein the lines of connection are especially preferably a weld.

Additional features as well as benefits resulting therefrom will emerge from the following description of the drawings. It should be emphasized at this point that all of the optional aspects of the method described herein can be implemented on the one hand by themselves, but on the other hand, also in combination with one or more other features in an example. The preferred examples described herein below serve merely for an explanation and a better understanding and are in no way to be understood as limiting.

FIG. 1 shows a preferred example of a first (1(c)) and a second (1(b)) housing part as well as a housing (1(a)) joined together from these. The housing comprises a bottom element defined by the coordinates A, B, C and D as well as a lid element defined by the coordinates E, F, G and H. These connect together by four side elements (defined by the corners C, D, G and H as well as B, C, F and G as well as A, B, E and F as well as D, A, H and E). Both the bottom element and the lid element as well as the side elements are rectangular in shape. Altogether, they form a cuboid. The housing comprises two through holes. These are led in the side element defined by the coordinates CDGH.

The lines of connection along which the housing joins together are shown darker than the other lines and also as a "dot-dash line." Preferably, these lines are weld lines. The lines of connection are defined by the coordinates A-B-C-G-H-D-A (all coordinates are corners).

FIG. 2 shows a preferred example of a first (2(c)) and a second (2(b)) housing part as well as a housing (2(a)) joined together therefrom. The housing comprises a bottom element defined by the coordinates A, B, C and D as well as a lid element defined by the coordinates E, F, G and H. They connect together by four ide elements (defined by the corners C, D, G and H as well as B, C, F and G as well as A, B, E and F as well as D, A, H and E). Both the bottom element and the lid element as well as the side elements are rectangular in shape. Altogether, they form a cuboid. The housing comprises two through holes. They are led in the side element defined by the coordinates CDGH.

The lines of connection along which the housing joins together are shown darker than the other lines and also as a "dot-dash line." Preferably, these lines are weld lines. The lines of connection are defined by the coordinates A-B-F-G-H-D-A (all coordinates are corners).

FIG. 3 shows a preferred example of a first (3(c)) and a second (3(b)) housing part as well as a housing (3(a)) joined together therefrom. The housing comprises a bottom element defined by the coordinates A, B, C and D as well as a lid element defined by the coordinates E, F, G and H. They connect together by four side elements (defined by the corners C, D, G and H as well as B, C, F and G as well as A, B, E and F as well as D, A, H and E). Both the bottom element and the lid element as well as the side elements are rectangular in shape. Altogether, they form a cuboid. The housing comprises two through holes. They are led in the side element defined by the coordinates CDGH.

The lines of connection along which the housing joins together are shown darker than the other lines and also as a "dot-dash line." Preferably, these lines are weld lines. The lines of connection are defined by the coordinates A-B-F-G-H-E-A (all coordinates are corners).

FIG. 4 shows a preferred example of a first (4(c)) and a second (4(b)) housing part as well as a housing (4(a)) joined together therefrom. The housing comprises a bottom element defined by the coordinates A, B, C and D as well as a lid element defined by the coordinates E, F, G and H. They connect together by four side elements (defined by the corners C, D, G and H as well as B, C, F and G as well as A, B, E and F as well as D, A, H and E). Both the bottom element and the lid element as well as the side elements are rectangular in shape. Altogether, they form a cuboid. The housing comprises two through holes. They are led in the side element defined by the coordinates CDGH.

The lines of connection along which the housing joins together are shown darker than the other lines and also as a "dot-dash line." Preferably, these lines are weld lines. The lines of connection are defined by the coordinates A-B-G-H-D-A (all coordinates are corners).

FIG. 5 shows a preferred example of a first (5(c)) and a second (5(b)) housing part as well as a housing ((5(a)) joined together therefrom. The housing comprises a bottom element defined by the coordinates A, B, C and D as well as a lid element defined by the coordinates E, F, G and H. They connect together by four side elements (defined by the corners C, D, G and H as well as B, C, F and G as well as A, B, E and F as well as D, A, H and E). Both the bottom element and the lid element as well as the side elements are rectangular in shape. Altogether, they form a cuboid. The housing comprises two through holes. They are led in the side element defined by the coordinates CDGH.

The lines of connection along which the housing joins together are shown darker than the other lines and also as a "dot-dash line." Preferably, these lines are weld lines. The lines of connection are defined by the coordinates A-B-G-H-A (all coordinates are corners).

FIG. 6 shows a preferred example of a first (6(c)) and a second (6(b)) housing part as well as a housing (6(a)) joined together therefrom. The housing comprises a bottom element defined by the coordinates A, B, C and D as well as a lid element defined by the coordinates E, F, G and H. They connect together by four side elements (defined by the corners C, D, G and H as well as B, C, F and G as well as A, B, E and F as well as D, A, H and E). Both the bottom element and the lid element as well as the side elements are rectangular in shape. Altogether, they form a cuboid. The housing comprises two through holes. They are led in the side element defined by the coordinates CDGH.

The lines of connection along which the housing joins together are shown darker than the other lines and also as a "dot-dash line." Preferably, these lines are weld lines. The lines of connection are defined by the coordinates B-F-G-H-D-C-B (all coordinates are corners).

FIG. 7 shows a preferred example of a first (7(c)) and a second ((7(b)) housing part as well as a housing (7(a)) joined together therefrom. The housing comprises a bottom element defined by the coordinates A, B, C and D as well as a lid element defined by the coordinates E, F, G and H. They connect together by four side elements (defined by the corners C, D, G and H as well as B, C, F and G as well as A, B, E and F as well as D, A, H and E). Both the bottom element and the lid element as well as the side elements are rectangular in shape. Altogether, they form a cuboid. The housing comprises two through holes. They are led in the side element defined by the coordinates CDGH.

The lines of connection along which the housing joins together are shown darker than the other lines and also as a "dot-dash line." Preferably, these lines are weld lines. The lines of connection are defined by the coordinates B-F-G-H-E-A-D-C-B (all coordinates are corners).

FIG. 8 shows a preferred example of a first (8(*c*)) and a second (8(*b*)) housing part as well as a housing (8(*a*)) joined together therefrom. The housing comprises a bottom element defined by the coordinates A, B, C and D as well as a lid element defined by the coordinates E, F, G and H. They connect together by four side elements (defined by the corners C, D, G and H as well as B, C, F and G as well as A, B, E and F as well as D, A, H and E). Both the bottom element and the lid element as well as the side elements are rectangular in shape. Altogether, they form a cuboid. The housing comprises two through holes. They are led in the side element defined by the coordinates CDGH.

The lines of connection along which the housing joins together are shown darker than the other lines and also as a "dot-dash line." Preferably, these lines are weld lines. The lines of connection are defined by the coordinates F-CG-DH-E-F. In this case, the coordinates are two corners (E and F) as well as two points on the edges CG and DH. The points on the edges CG and DH are designated k2 and k1.

FIG. 9 shows a preferred example of a first (9(*c*)) and a second (9(*b*)) housing part as well as a housing (9(*a*)) joined together therefrom. The housing comprises a bottom element defined by the coordinates A, B, C and D as well as a lid element defined by the coordinates E, F, G and H. They connect together by four side elements (defined by the corners C, D, G and H as well as B, C, F and G as well as A, B, E and F as well as D, A, H and E). Both the bottom element and the lid element as well as the side elements are rectangular in shape. Altogether, they form a cuboid. The housing comprises two through holes. They are led in the side element defined by the coordinates CDGH.

The lines of connection along which the housing joins together are shown darker than the other lines and also as a "dot-dash line." Preferably, these lines are weld lines. The lines of connection are defined by the coordinates AE-BF-CG-DH-AE. In this case, the coordinates are four points on the edges AE, BF, CG and DH. The points on the edges are designated k1, k2, k3 and k4.

FIG. 10 shows a preferred example of a first (10(*c*)) and a second (10(*b*)) housing part as well as a housing (10(*a*)) joined together therefrom. The housing comprises a bottom element defined by the coordinates A, B, C and D as well as a lid element defined by the coordinates E, F, G and H. They connect together by four side elements (defined by the corners C, D, G and H as well as B, C, F and G as well as A, B, E and F as well as D, A, H and E). Both the bottom element and the lid element as well as the side elements are rectangular in shape. Altogether, they form a cuboid. The housing comprises two through holes. They are led in the side element defined by the coordinates CDGH.

The lines of connection along which the housing joins together are shown darker than the other lines and also as a "dot-dash line." Preferably, these lines are weld lines. The lines of connection are defined by the coordinates BC-FG-EH-AD-BC. In this case, the coordinates are four points on the edges AD, BC, FG and EH. The points on the edges are designated k5, k6, k7 and k8.

FIG. 11 shows a preferred example of a first (11(*c*)) and a second (11(*b*)) housing part as well as a housing (11(*a*)) joined together therefrom. The housing comprises a bottom element defined by the coordinates A, B, C and D as well as a lid element defined by the coordinates E, F, G and H. They connect together by four side elements (defined by the corners C, D, G and H as well as B, C, F and G as well as A, B, E and F as well as D, A, H and E). Both the bottom element and the lid element as well as the side elements are rectangular in shape. Altogether, they form a cuboid. The housing comprises two through holes. They are led in the side element defined by the coordinates CDGH.

The lines of connection along which the housing joins together are shown darker than the other lines and also as a "dot-dash line." Preferably, these lines are weld lines. The lines of connection are defined by the coordinates G-H-AE-BF-G. In this case, the coordinates are two corners (G and H) as well as two points on the edges AE and BF. The points on the edges AE and BF are designated k3 and k4.

FIG. 12 shows a preferred example of a first (12(*c*)) and a second (12(*b*)) housing part as well as a housing (12(*a*)) joined together therefrom. The housing comprises a bottom element defined by the coordinates A, B, C and D as well as a lid element defined by the coordinates E, F, G and H. They connect together by four side elements (defined by the corners C, D, G and H as well as B, C, F and G as well as A, B, E and F as well as D, A, H and E). Both the bottom element and the lid element as well as the side elements are rectangular in shape. Altogether, they form a cuboid. The housing comprises two through holes. These are led in the side element defined by the coordinates CDGH.

The lines of connection along which the housing joins together are shown darker than the other lines and also as a "dot-dash line." Preferably, these lines are weld lines. The lines of connection are defined by the coordinates AE-BF-CG-BH-AE. In this case, the coordinates are four points on the edges AE, BF, CG and BH. The points on the edges are designated k1, k2, k3 and k4.

The invention claimed is:

1. A method of producing a battery with a prismatic battery housing made of metal components, comprising:
   a bottom element,
   a lid element disposed parallel to said bottom element, having the same size and shape, and
   four side elements connecting the bottom element and the lid element, which together define an enclosed interior, in which functional parts of the battery are arranged, wherein
   one of the elements comprises at least one through hole, through which a contact pole is led, which contact pole electrically connects to at least one of the electrodes disposed in the interior,
the method comprising:
   assembling the battery housing from two prefabricated housing parts, of which
   the first housing part comprises at least a partial region of the one of the elements comprising the at least one through hole as well as at least a partial region of a second element, bordering on the one of the elements comprising the at least one through hole, and
   the second housing part comprises all elements and/or partial regions of elements not part of the first housing part,
   wherein the two prefabricated housing parts joined together form a cuboidal housing with six rectangular surfaces, eight corners and twelve edges, whose base surface is formed by the bottom element and has four corners A, B, C and D and whose top surface is formed by the lid element and has four corners E, F, G and H, wherein the corner E is disposed above the corner A, the corner F above the corner B, the corner G above the corner C and the corner H above the corner D, and
   wherein the two prefabricated housing parts are joined together along four lines of connection defined by the following coordinates A-B-G-H-A or F-CG-DH-E-F or G-H-AE-BF-G or AE-BF-CG-DH-AE or along six lines of connection defined by the following coordinates A-B-F-G-H-D-A.

2. The method as claimed in claim 1, wherein the first housing half-piece has at least one of
the one of the elements comprising the through hole entirely,
the second element entirely,
a third element or a partial region of a third element bordering on the second element or a partial region of same,
a third element or a partial region of a third element bordering on the element comprising the through hole or a partial region of same, or
a fourth element or a partial region of a fourth element bordering on the element comprising the through hole and/or on the second element and/or on the third element or a partial region of said elements.

3. The method as claimed in claim 1, wherein the first and the second housing part have a symmetrical relation to each other, apart from the at least one through hole, can be converted into each other by mirror imaging or mirror rotation.

4. The method as claimed in claim 1, wherein the first and the second housing part, apart from the at least one through hole, are half-pieces of identical size and shape.

5. The method as claimed in claim 1, wherein the first housing part and the second housing part are joined together by welding.

6. The method as claimed in claim 1, further comprising one or more of:
arranging the functional parts as a preassembled unit on the first housing part or premounted on the first housing part,
leading a contact pole through a through hole in one of the elements of the first housing part and fixed therein so that it is electrically insulated from the element comprising the through hole,
electrically connecting the contact pole to one of the electrodes, and
joining the second housing part together with the first housing part to form the housing.

7. A battery comprising as functional parts at least one positive battery electrode and at least one negative battery electrode as well as at least one separator separating the electrodes, and a prismatic housing made up of metal components including
a bottom element,
a lid element disposed parallel to said bottom element, having the same size and shape, and
four side elements connecting the bottom element and the lid element, which together define an enclosed interior, in which the functional parts of the battery are arranged, wherein
one of the elements comprises at least one through hole, through which a contact pole is led, which contact pole produces an electrical contact to a positive and/or negative electrode disposed inside the housing,
the housing consists of two housing parts, of which the first housing part comprises at least a partial region of the one of the elements comprising the at least one through hole as well as at least a partial region of a second element, directly bordering on the one of the elements comprising the at least one through hole,
and the second housing part comprises all elements and/or partial regions of elements which are not part of the first housing part,
the housing is cuboidal with six rectangular surfaces, eight corners and twelve edges, wherein the base surface of the cuboid is formed by the bottom element and has four corners A, B, C and D and a top surface of the cuboid is formed by the lid element and has four corners E, F, G and H, wherein the corner E is disposed above the corner A, the corner F above the corner B, the corner G above the corner C and the corner H above the corner D,
wherein the two prefabricated housing parts are joined together along four lines of connection defined by the following coordinates A-B-G-H-A or F-CG-DH-E-F or G-H-AE-BF-G or AE-BF-CG-DH-AE or along six lines of connection defined by the following coordinates A-B-F-G-H-D-A.

8. A method of producing a battery with a prismatic battery housing made of metal components, comprising:
a bottom element,
a lid element disposed parallel to said bottom element, having the same size and shape, and
four side elements connecting the bottom element and the lid element, which together define an enclosed interior, in which functional parts of the battery are arranged, wherein
one of the elements comprises at least one through hole, through which a contact pole is led, which contact pole electrically connects to at least one of the electrodes disposed in the interior,
the method comprising:
assembling the battery housing by welding two prefabricated housing parts, of which
the first housing part comprises at least a partial region of the one of the elements comprising the at least one through hole as well as at least a partial region of a second element, bordering on the one of the elements comprising the at least one through hole, and
the second housing part comprises all elements and/or partial regions of elements not part of the first housing part,
wherein the two prefabricated housing parts joined together form a cuboidal housing with six rectangular surfaces, eight corners and twelve edges, whose base surface is formed by the bottom element and has four corners A, B, C and D and whose top surface is formed by the lid element and has four corners E, F, G and H, wherein the corner E is disposed above the corner A, the corner F above the corner B, the corner G above the corner C and the corner H above the corner D,
the two prefabricated housing parts are joined together along four lines of connection defined by the following coordinates A-B-G-H-A or F-CG-DH-E-F or G-H-AE-BF-G or AE-BF-CG-DH-AE or along six lines of connection defined by the following coordinates A-B-F-G-H-D-A,
the first and the second housing part each are a single piece, and
adjoining elements of the prefabricated housing parts form a right angle.

9. A battery comprising as functional parts at least one positive battery electrode and at least one negative battery electrode as well as at least one separator separating the electrodes, and a prismatic housing made up of
a bottom element, a lid element disposed parallel to said bottom element, having the same size and shape, and four side elements connecting the bottom element and the lid element, which together define an enclosed interior, in which the functional parts of the battery are arranged, wherein one of the elements comprises at least one through hole, through which a contact pole is led, which contact pole produces an electrical contact to a positive and/or negative electrode disposed inside the housing, the housing consists of two single piece metal housing parts, of which a first housing part comprises at least a partial region of the one of the elements comprising the at least one through hole as well as at least a partial region of a second element, directly bordering on the one of the elements comprising the at least one through hole, and a second housing part comprises all elements and/or partial regions of elements which are not part of the first housing part, the housing is cuboidal with six rectangular surfaces, eight corners and twelve edges, wherein the base surface of the cuboid is formed by the bottom element and has four corners A, B, C and D and a top surface of the cuboid is formed by the lid element and has four corners E, F, G and H, wherein the corner E is disposed above the corner A, the corner F above the corner B, the corner G above the corner C and the corner H above the corner D, and the two housing parts are joined together along four welded lines of connection defined by the following coordinates A-B-G-H-A or F-CG-DH-E-F or G-H-AE-BF-G or AE-BF-CG-DH-AE or along six welded lines of connection defined by the following coordinates A-B-F-G-H-D-A.

10. A method of producing a battery with a prismatic battery housing made of metal components, comprising:

a bottom element, a lid element disposed parallel to said bottom element, having the same size and shape, and four side elements connecting the bottom element and the lid element, which together define an enclosed interior, in which functional parts of the battery are arranged, wherein one of the elements comprises at least one through hole, through which a contact pole is led, which contact pole electrically connects to at least one of the electrodes disposed in the interior, the method comprising:

assembling the battery housing from two prefabricated housing parts, of which the first housing part comprises at least a partial region of the one of the elements comprising the at least one through hole as well as at least a partial region of a second element, bordering on the one of the elements comprising the at least one through hole, and the second housing part comprises all elements and/or partial regions of elements not part of the first housing part, wherein the two prefabricated housing parts joined together form a cuboidal housing with six rectangular surfaces, eight corners and twelve edges, whose base surface is formed by the bottom element and has four corners A, B, C and D and whose top surface is formed by the lid element and has four corners E, F, G and H, wherein the corner E is disposed above the corner A, the corner F above the corner B, the corner G above the corner C and the corner H above the corner D, and wherein the two prefabricated housing parts are joined together along four lines of connection defined by the following coordinates A-B-G-H-A or F-CG-DH-E-F or G-H-AE-BF-G or along six lines of connection defined by the following coordinates A-B-F-G-H-D-A.

11. A battery comprising as functional parts at least one positive battery electrode and at least one negative battery electrode as well as at least one separator separating the electrodes, and a prismatic housing made up of metal components including a bottom element, a lid element disposed parallel to said bottom element, having the same size and shape, and four side elements connecting the bottom element and the lid element, which together define an enclosed interior, in which the functional parts of the battery are arranged, wherein one of the elements comprises at least one through hole, through which a contact pole is led, which contact pole produces an electrical contact to a positive and/or negative electrode disposed inside the housing, the housing consists of two housing parts, of which the first housing part comprises at least a partial region of the one of the elements comprising the at least one through hole as well as at least a partial region of a second element, directly bordering on the one of the elements comprising the at least one through hole, and the second housing part comprises all elements and/or partial regions of elements which are not part of the first housing part, the housing is cuboidal with six rectangular surfaces, eight corners and twelve edges, wherein the base surface of the cuboid is formed by the bottom element and has four corners A, B, C and D and a top surface of the cuboid is formed by the lid element and has four corners E, F, G and H, wherein the corner E is disposed above the corner A, the corner F above the corner B, the corner G above the corner C and the corner H above the corner D, wherein the two prefabricated housing parts are joined together along four lines of connection defined by the following coordinates A-B-G-H-A or F-CG-DH-E-F or G-H-AE-BF-G or along six lines of connection defined by the following coordinates A-B-F-G-H-D-A.

* * * * *